United States Patent [19]

Nagumo et al.

[11] Patent Number: 4,976,153
[45] Date of Patent: Dec. 11, 1990

[54] KARMAN VORTEX FLOW METER

[75] Inventors: Mutsumi Nagumo; Wataru Nakagawa; Michihiko Tsuruoka, all of Kanagawa, Japan

[73] Assignee: Fuji Electric Co., Ltd., Kanagawa, Japan

[21] Appl. No.: 262,647

[22] Filed: Oct. 26, 1988

[30] Foreign Application Priority Data

Oct. 27, 1987 [JP] Japan .................. 62-271342
Oct. 27, 1987 [JP] Japan .................. 62-271343

[51] Int. Cl.⁵ .................. G01F 1/32; G01F 1/86
[52] U.S. Cl. .................. 73/861.03; 73/861.24
[58] Field of Search ........... 73/861.02, 861.03, 861.24, 73/861.22

[56] References Cited

U.S. PATENT DOCUMENTS

| | | | |
|---|---|---|---|
| 3,785,204 | 1/1974 | Lisi | 73/861.02 |
| 4,134,297 | 1/1979 | Herzl | 73/861.24 |
| 4,169,376 | 10/1979 | Herzl | 73/861.24 |
| 4,470,310 | 9/1984 | Tsuruoka et al. | 73/861.24 |

FOREIGN PATENT DOCUMENTS 2147103A 5/1985 United Kingdom .
2160318A 12/1985 United Kingdom .

Primary Examiner—Herbert Goldstein
Attorney, Agent, or Firm—Finnegan, Henderson, Farabow, Garrett, and Dunner

[57] ABSTRACT

In a Karman vortex flow meter, the variation of pressure caused near both sides of a Karman vortex forming unit inserted into the stream of fluid is applied to an oscillating member which is oscillating in a self-excited mode at a resonance frequency, so that the vortex frequency; i.e., the volume flow rate is detected from the modulation of the resonance frequency which is caused by variation of pressure or density attributing to the vortexes formed.

6 Claims, 5 Drawing Sheets

KARMAN VORTEX FLOW METER

BACKGROUND OF THE INVENTION

1. Field of the Invention

This invention relates to a Karman vortex flow meter which detects the frequency of Karman vortexes formed downstream of a prismatic member inserted in a stream of fluid, to measure the flow rate of the fluid.

2. Prior Art

A method in which the attenuation of an ultrasonic wave emitted in a fluid is measured with a signal transmitting sensor and a signal receiving sensor has been employed to detect the vortex pressure variation of a Karman vortex flow meter of this type.

However, the method is disadvantageous in the following points: The method is not economical because it uses the two sensors which are expensive. Furthermore, in the method, the extremely small sound pressure variation of the ultrasonic wave is detected in an analog mode, and therefore the detection is liable to be affected by noise. In order to eliminate the difficulty, the circuit is unavoidably intricate in arrangement.

SUMMARY OF THE INVENTION

Accordingly, an object of this invention is to provide a Karman vortex flow meter simple in construction in which the above-described difficulties have been eliminated.

The foregoing object and other objects of the invention have been achieved by the provision of a Karman vortex flow meter for detecting a flow rate from the frequency of vortexes formed by a Karman vortex forming unit inserted into a stream of fluid; in which, according to the invention, the variation in pressure of the fluid caused near both sides of the Karman vortex forming unit is applied to an oscillating member producing a modulated signal whose frequency changes with the density of the fluid, to detect a Karman vortex frequency by demodulating the modulated signal.

The nature, principle and utility of the invention will become more apparent from the following detailed description when read in conjunction with the accompanying drawings.

BRIEF DESCRIPTION OF THE DRAWINGS

In the accompanying drawings:

FIGS. 5A to 5C are an explanatory diagrams used for a description of the operating principle of this invention, in which FIG. 5A is an explanatory diagram of an oscillation system, and FIGS. 5B and 5C are equivalent circuit diagrams of the oscillation system shown in FIG. 5A;

DETAILED DESCRIPTION OF THE PREFERRED EMBODIMENTS

A first embodiment of this invention will be described with reference to FIGS. 1 through 5.

Figure 1:
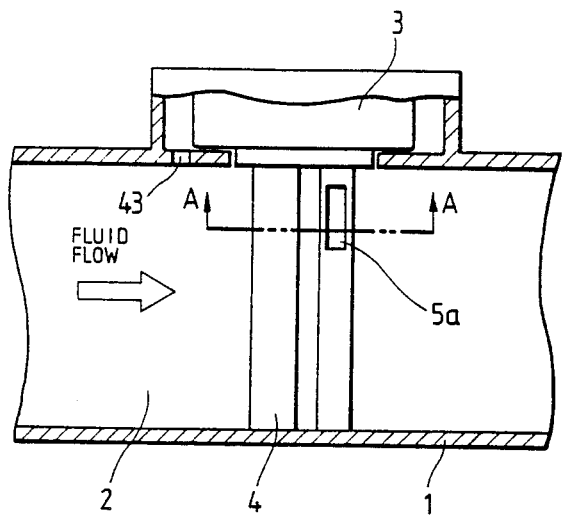
FIG. 1 is a sectional view showing a Karman vortex flow member according to one embodiment of the present invention.
Figure 2:
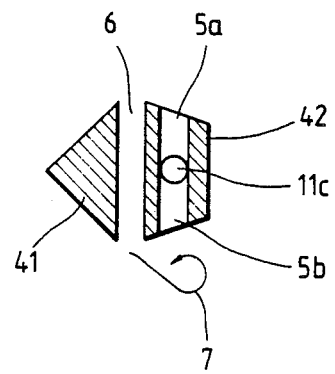
FIG. 2 is a sectional view taken along line A—A in FIG. 1, showing a vortex forming unit.

In FIG. 1, reference numeral 1 designates a pipe; 4, a vortex forming means for producing a Karman vortex street; and 3, a vortex detection means. The vortex forming means 4, as shown in FIG. 2, comprises an upstream prismatic element 41 isosceles-triangular in section and a downstream prismatic element 42 isosceles-trapezoidal in section. The two prismatic elements 41 and 42 are inserted in the stream of fluid in the pipe in such a manner that they are perpendicular to the steam of fluid with a predetermined distance therebetween. The downstream prismatic element 42 has slits 5a and 5b on both sides of its one end portion in such a manner that the slits are communicated with each other. The slits are used to apply the variation in pressure of a vortex formed to the detector 3.

Figure 3:
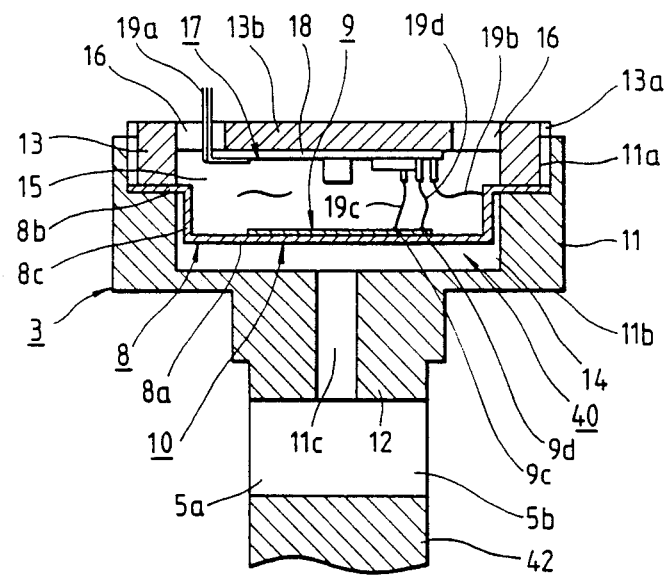
FIG. 3 is a vertical sectional view of a detector shown in FIG. 1.
Figure 4:
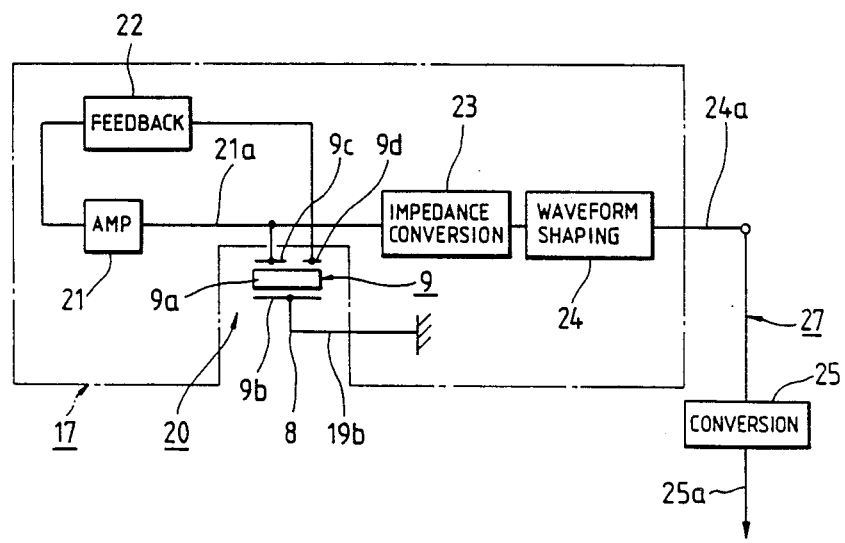
FIG. 4 is a block diagram showing an electrical circuit of the detector in FIG. 3.

The vortex detection means is shown in FIGS. 3 and 4. Reference numeral 8 designates a bottomed cylindrical vibrator which comprises: a bottom 8a to the inner surface to which a piezo oscillator 9 is fixedly bonded; and a flange 8b at the opening. The vibrator 8 is made of a thin metal plate about 0.1 mm in thickness. The piezo oscillator 9 is made up of a disc-shaped piezo substrate 9a 0.1 to 0.2 mm in thickness, a first electrode 9b formed on one surface of the substrate 9a, and second and third electrodes 9c and 9d formed on the other surface of the substrate 9a. The one surface of the substrate 9a on which the first electrode 9b is formed is held in contact with the inner surface of the bottom 8a of the vibrator 8 so that the first electrode 9b is electrically connected to the vibrator 8. The vibrator 8 and the piezo oscillator 9 form a vibrating board 10.

Further in FIG. 3, reference numeral 11 designates a bottomed cylindrical container. The inner wall of the upper open end portion of the container 11 is female-threaded as indicated at 11a. One end of a cylinder 12 is fixedly secured to the outer surface of the bottom 11b of the container 11 in such a manner that the cylinder 12 is coaxial with the container 11. A circular through-hole 11c having a diameter equal to the inside diameter of the cylinder 12 is formed in the bottom 11b of the container 11 in such a manner that it is communicated with the inside of the cylinder 12 and the pressure introducing openings 5a and 5b. In FIG. 3, reference numeral 13 designates a bottomed cylindrical housing whose outer wall is male-threaded as indicated at 13a. The housing 13 is screwed into the container 11 so that the flange 8b of the vibrator 8 is held between the housing 13 and the container 11 whereby the vibrator 8 is fixedly held in the space defined by the housing 13 and the container 11. Further in FIG. 3, reference numeral 14 designates a first space formed by the vibrating board 10 and the container 11; and 15, a second space defined by the vibrating board 10 and the housing 13. Through-holes 16 and 16 are formed in the bottom 13b of the housing 13. A printed circuit board 18 forming a detecting circuit 17 is fixedly bonded to the inner surface of the bottom 13b of the housing 13. The first and second spaces 14 and 15 are fluid-tightly separated from each other by the vibrating board 10.

The detector 3 further comprises lead wires 19a which are extended from the detecting circuit 17 through the through-hole 16 to an external circuit outside of the second space 15, a lead wire 19b connected between the vibrator 8 and the detecting circuit 17, and lead wires 19c and 19d connected between the detecting circuit 17 and the electrodes 9c and 9d of the piezo oscillator 9.

The arrangement and operation of the detecting circuit 17 will be described with reference to FIG. 4.

In FIG. 4, reference numeral 21 designates an amplifier whose output voltage is applied through the electrode 9c to the piezo substrate 9a; and 22, a feedback circuit for detecting a voltage generated by the piezo substrate 9a through the electrode 9d and positively feeding back it to the amplifier 21. The vibrating board 10 is formed as described above, and the piezo substrate 9a is vibrated (expanded and contracted) radially when AC voltage is applied across the electrodes 9b and 9c. Therefore, when the piezo substrate 9a vibrates in this manner, the bottom 8a of the vibrator 8 is vibrated in the axial direction of the vibrator 8. As a result, an AC voltage corresponding to the strain of the piezo substrate 9a is generated across the electrodes 9d and 9b, and positively fed back to the amplifier 21 through the feedback circuit 22. As a result, the vibrating board 10 is maintained resonated at a natural frequency F; that is, it is placed in self-oscillation state.

The detecting circuit 17 further comprises: an impedance conversion circuit 23 which receives the output AC voltage 21a of the amplifier 21 having a frequency equal to the natural frequency F, to facilitate a signal processing operation (described later) which is carried out for the voltage; and a waveform shaping circuit 24 which subjects the output signal of the conversion circuit 23 to waveform shaping, to output a pulse train signal 24a having the frequency F. As is apparent from the above description, the detecting circuit 17 is made up of the amplifier 21, the feedback circuit 22, the impedance conversion circuit 23, the waveform shaping circuit 24, and the printed circuit board 18 bearing these circuits.

Further in FIG. 4, reference numeral 25 designates a means for detecting the frequency of vortex formation by demodulating the aforementioned signal 24a thereby outputting a signal 25a whose frequency is indicative of the fluid flow rate.

When the detector 3 with the vortex forming unit 4 shown in FIG. 3 is arranged in the pipe 1 as shown in FIG. 1, the fluid 2 flows into the space 14 through the pressure introducing openings 5a and 5b and the through-hole 11c, and into the space 15 through a through-hole 43 formed in the pipe 1 and the through-holes 16. When, under this condition, the vibrating board 10 is self-oscillated in the above-described manner, the vibrating board will vibrate at the resonance frequency of a vibration system including the first space 14, the part of the through-hole 11c, the inside of the cylinder 12, and the vibrating board 10.

Figure 6:
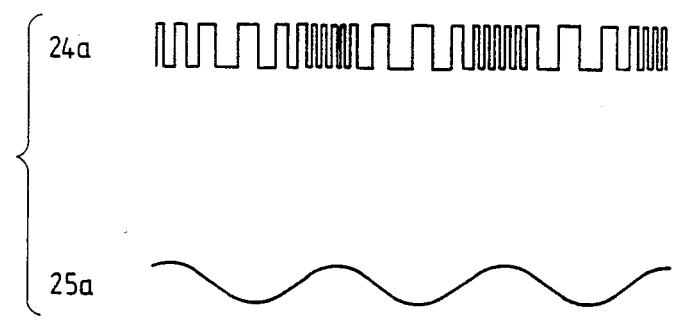
FIG. 6 is an explanatory diagram used for a description of the output signal of the detector.

The resonance output is much higher than the Karman vortex generating output As the fluid flows in the pipe 1, Karman vortex pressure variation occurs near both sides of the vortex forming unit, and the above-described resonance frequency is modulated in synchronization with the variation. On the other hand, it has been found through experiments that the Karman vortex pressure increased and decreased from the average pressure in the pipe 1. Accordingly, the pulse train signal 24a outputted by the waveform shaping circuit 24 is such that the resonance frequency of the vibrating board 10 based on the average density of the fluid in the pipe 1 is modulated with the Karman vortex generating frequency based on the volume flow rate of the fluid. Thus, the volume flow rate of the fluid flowing in the pipe 1 can be detected from the frequency of the modulation of the pulse train signal with the vortex. This will become more apparent from FIG. 6, in which reference character 25a designates the Karman vortex modulation frequency component extracted from the pulse train signal 24a by the signal conversion circuit 25, thus representing the Karman vortex frequency (volume flow rate).

Referring to FIG. 4, reference numeral 27 designates a frequency detecting section which comprises the vibrator 9, the detecting circuit 17, and the signal conversion circuit 25, to detect the modulation frequency Fk of the vibration system 40.

The vibration of the vibrating board 10 will be described with reference to FIGS. 5A to 5C.

As shown in FIG. 3, the side wall 8c of the vibrator 8 is confronted through an extremely small gap with the inner wall of the container 11 permitting the space 15 to be much larger in volume than the space 14 so that, even when the vibrating board 10 vibrates as described above, the pressure in the space 15 is substantially maintained unchanged. The sum of the opening areas of the through-holes 16 is considerably large so that the natural frequency of the space 15 is much lower than that of the vibration system 40 consisting of the vibrating board 10, the space 14, the through-hole 11c, and the inside space of the cylinder 12. Therefore, for simplification in description, the essential components in FIG. 3 may be as shown in FIG. 5A. In FIG. 5A, reference character Mm designates the mass of the vibrating board 10, S is the area of the bottom 8a of the vibrator 8, Cm is the compliance corresponding to the spring constant Km of the vibrating board 10, $Cm = 1/Km$, Ma is the mass of the fluid 2 under test in the cylinder 12, and Ca is the acoustic capacity in the space 14. The acoustic capacity Ca is represented by the following equation (1):

$$Ca = W/(X^2 \cdot \rho) \tag{1}$$

where W is the volume of the space 14, X is the acoustic velocity in the fluid 2, and $\rho$ is the density of the fluid 2.

Figure 5A:
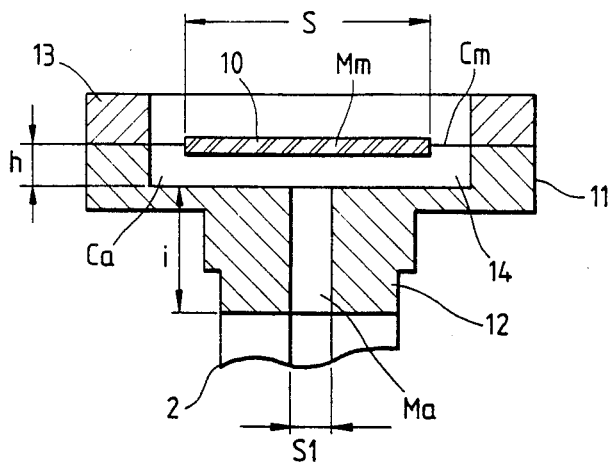

In FIG. 5A, the vibration system is so designed that the height h of the space 14 and the sectional area $S_1$ of the inside space of the cylinder 12 are both extremely small, and both the mass of the fluid in the space 14 and the acoustic capacity in the inside space of the cylinder 12 can be disregarded. Therefore, with the acoustic vibration system converted into a mechanical vibration system so that vibration system shown in FIG. 5A can be represented by an electrical equivalent circuit shown in FIG. 5B. In FIG. 5B, MaO and CaO are the mass and the acoustic compliance which are represented by the following equation (2):

$$\left. \begin{array}{l} MaO = Ma(S^2/S_1^2) \\ CaO = Ca/S^2 \end{array} \right\} \tag{2}$$

Figure 5B:
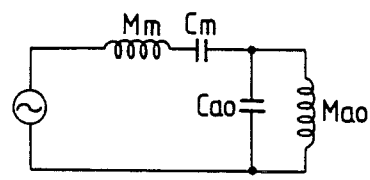
Figure 5C:
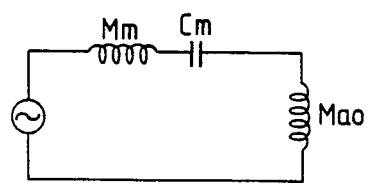

If, in FIG. 5B, the following equation (3) is established in which ω is the angular frequency of a vibration, then the circuit of FIG. 5B can be converted into the circuit of FIG. 5C. If the resonance frequency of the circuit shown in FIG. 5C is represented by F, then the following equation (4) will be established:

$$\left|\frac{1}{\omega \cdot CaO}\right| \gg |\omega \cdot MaO| \tag{3}$$

$$F = \omega/2\pi$$

$$\omega = \sqrt{\frac{1}{Cm \cdot Mm \cdot (1 + MaO/Mm)}} \\ = \sqrt{\frac{1}{Cm \cdot \{Mm + Ma(S^2/S_1^2)\}}} \tag{4}$$

From equations (2), (3) and (4), the following expression (5) is obtained:

$$\frac{1}{(1 + Mm/MaO)} \cdot \frac{CaO}{Cm} \ll 1 \tag{5}$$

As is apparent from equation (4), when the essential components shown in FIG. 1 are so designed that the equivalent circuit shown in FIG. 5C is formed, the vibrating board resonates at the frequency F, and the frequency F of the pulse train forming the output signal 24a of the waveform shaping circuit shown in FIG. 4 corresponds to the mass Ma of the fluid 2 under test.

Figure 7:
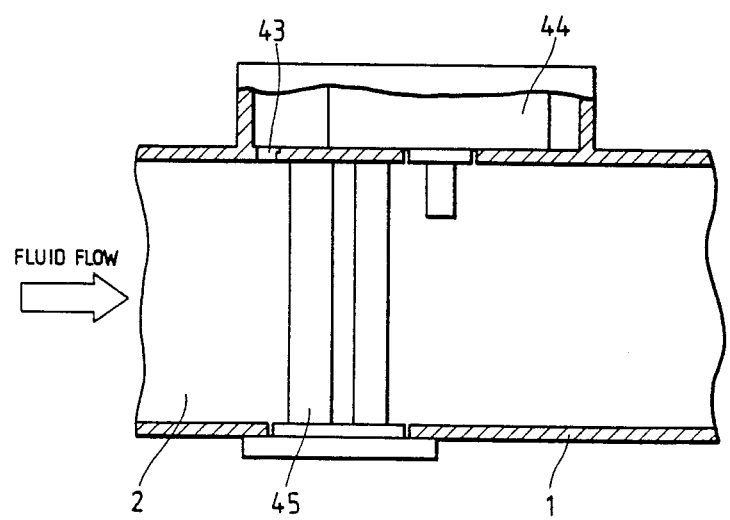
FIG. 7 is a sectional view showing a Karman vortex flow meter according to another embodiment of the present invention.

A second embodiment of the invention is as shown in FIG. 7. The second embodiment is different from the first embodiment shown in FIG. 1 in that a detecting section 44 and a vortex forming unit 45 are separate from each other. Thus, the detector 44 and the vortex forming unit can be individually replaced when necessary; that is, the maintenance of the Karman vortex flow meter can be achieved at a cost lower than that of the first embodiment. The detector 44 can be obtained by removing the downstream prismatic element 42 from the detector 3 shown in FIG. 3.

A third embodiment of the invention will be described with reference to FIG. 3 and 8.

Figure 8:
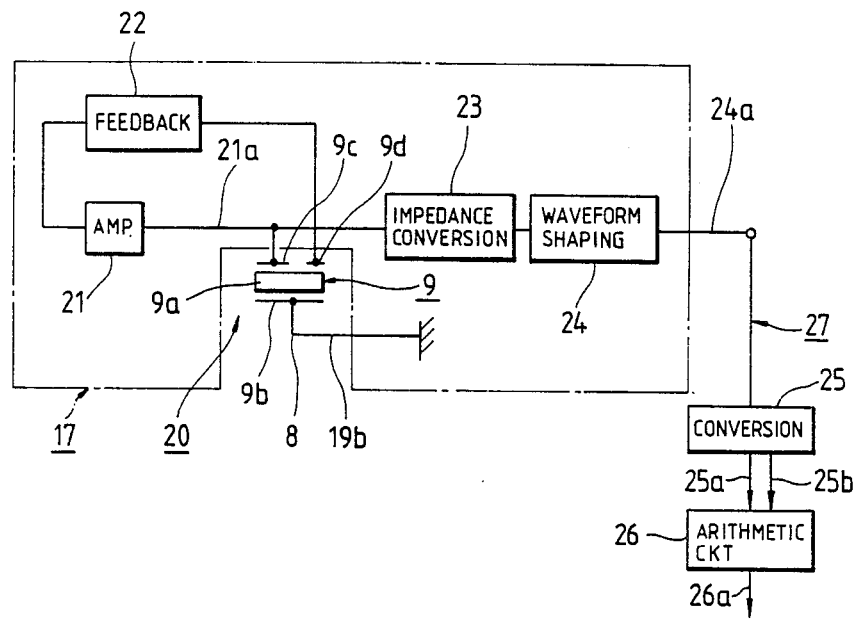
FIG. 8 is a block diagram showing an alternative electrical circuit of the detector in FIG. 3 according to a further embodiment of the present invention.
Figure 9:
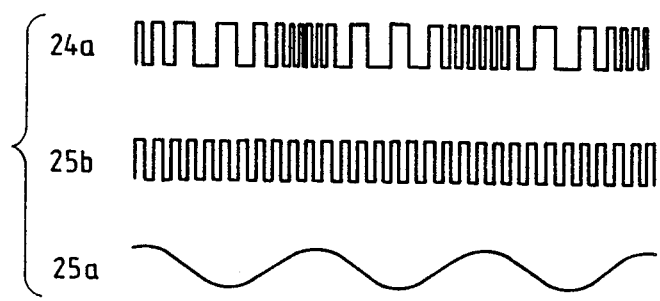
FIG. 9 is an explanatory diagram used for a description of the output signal of the detector.

This third embodiment is similar to the first, with the addition that in FIG. 8, reference numeral 25 designates a signal conversion circuit which receives the signal 24a and applies a signal 25b corresponding to the average frequency F of the pulse train forming the signal 24a and a modulation frequency signal 25a due to a Karman vortex street to an arithmetic section 26. Upon reception of the output signals 25a and 25b, the arithmetic section 26 performs an arithmetic operation according to an equation (described later), to output a mass flow rate signal 26a.

Accordingly, the density of the fluid 2 can be detected from the frequency F.

The arithmetic circuit 26 in FIG. 8 is so designed as to output the mass flow rate (=density×volume flow rate) signal 26a which is the product of the density obtained through calculation according to equation (4) and the Karman vortex frequency. Therefore, the measurement of a mass flow rate can be achieved with the simple circuit having only one sensor.

Thus, with the detector, a fluid such as gas which is low in density can be measured with high sensitivity and with high accuracy. Furthermore, the effect of the variation in vibration of the vibrating board 10 with the vibration in temperature of the fluid 2 under test on the measurement accuracy can be minimized, with the result that the fluid 2 can be measured over a wide range of temperatures.

As is apparent from the above description, in the Karman vortex flow meter of the invention, the variation of pressure caused near both sides of the Karman vortex forming unit inserted in the stream of fluid is applied to the acoustic vibration system including the cavity and the cylinder, so that the volume flow rate of the fluid is detected from the modulation of the resonance frequency of the system which is attributable to variations in pressure caused by Karman vortices. Therefore, the Karman vortex flow meter is simple in construction and low in manufacturing cost.

Furthermore, with the Karman vortex flow meter of the invention, the density of the fluid can be detected from the average resonance frequency of the vibration system which is a function of the mass of the fluid in the cylinder, with the result that the mass flow rate (density×volume flow rate) can be detected by using the density and the volume flow rate of the fluid.

Furthermore, in the Karman vortex flow meter of the invention, the acoustic compliance of the cavity is made smaller than the compliance of the vibrating board, so that the action of the fluid under test which increases the mass of the vibration system including the vibrating board during the vibration of the vibrating board is made more effective by the action of the cavity and the cylinder. Therefore, the Karman vortex flow meter of the invention can measure even gas with high accuracy, and it has a wide range of temperatures for measurement.

What is claimed is:

1. A Karman vortex flow meter for detecting a flow rate of fluid from the frequency of vortex formation comprising:
    a Karman vortex forming means inserted into a stream of a fluid for forming vortices near both sides thereof;
    an oscillating means, inserted into the fluid, oscillating at a resonant frequency that varies with fluid density, for producing an oscillating signal;
    means for transmitting variations in pressure from the vortex forming means to the oscillating means whereby changes in pressure caused by vortex formation induce a change in density near the oscillating means, thereby modulating the frequency of the oscillating signal; and
    means for detecting the frequency vortex formation including means for demodulating the oscillating signal thereby producing a signal whose frequency is indicative of the fluid flow rate.

2. A Karman vortex flow meter as claimed in claim 1, further including
    means for detecting a density of the fluid from the average frequency of the oscillating signal, and
    means, coupled to the means for detecting a density and to the means for detecting the frequency, for calculating a mass flow rate of the fluid from the density of the fluid and the frequency of the vortex.

3. A Karman vortex flow meter as claimed in claim 1, wherein said oscillating means comprises a vibrating board and an acoustic vibration system provided on at least one side of said vibrating board, said acoustic vibration system including a cavity and a cylinder.

4. A Karman vortex flow meter as claimed in claim 2, wherein said oscillating means comprises a vibrating board and an acoustic vibration system provided on at least one side of said vibrating board, said acoustic vibration system including a cavity and a cylinder.

5. A Karman vortex flow meter as claimed in either of claims 1 or 2, wherein said Karman vortex forming means is provided with a pressure introducing opening through which the vibration in pressure of the fluid is applied said mechanical vibrating means.

6. A Karman vortex flow meter as claimed in either of claims 3 or 4, wherein said Karman vortex forming means is provided with a pressure introducing opening through which the vibration in pressure of the fluid is applied to said mechanical vibrating means.

* * * * *